United States Patent [19]

Ellner et al.

[11] Patent Number: 5,074,152
[45] Date of Patent: Dec. 24, 1991

[54] PIEZORESISTIVE TRANSDUCER WITH LOW DRIFT OUTPUT VOLTAGE

[75] Inventors: Stuart Ellner; Laurel L. Hoekstra, both of Scottsdale; Eric A. Ramsland, Tempe; Renwin J. Yee, Mesa, all of Ariz.

[73] Assignee: Motorola, Inc., Schaumburg, Ill.

[21] Appl. No.: 633,828

[22] Filed: Dec. 24, 1990

[51] Int. Cl.$^5$ .............................................. G01L 1/00
[52] U.S. Cl. ........................................ 73/766; 73/708
[58] Field of Search ...................... 73/765, 766, 862.63, 73/708, 721, 727, 754, DIG. 4; 338/3

[56] References Cited
U.S. PATENT DOCUMENTS
4,771,638  9/1988  Sugiyama et al. .................... 73/721

Primary Examiner—Robert Raevis
Attorney, Agent, or Firm—Joe E. Barbee

[57] ABSTRACT

Leakage current is reduced in a piezoresistive transducer by forming a leakage barrier around a piezoresistive element of a piezoresistive transducer. The leakage barrier prevents the formation of a parasitic leakage path in the substrate thereby reducing the leakage current flowing through sections of the piezoresistive element, and stabilizing the resistance value and the output voltage of the piezoresistive transducer.

18 Claims, 3 Drawing Sheets

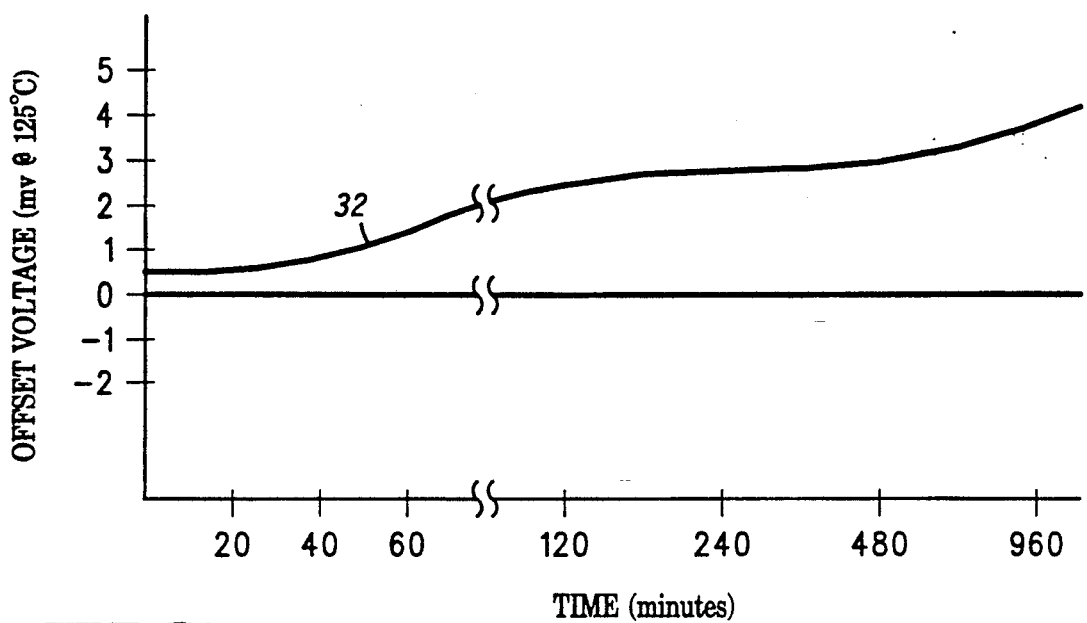
FIG. 3
FIG. 5
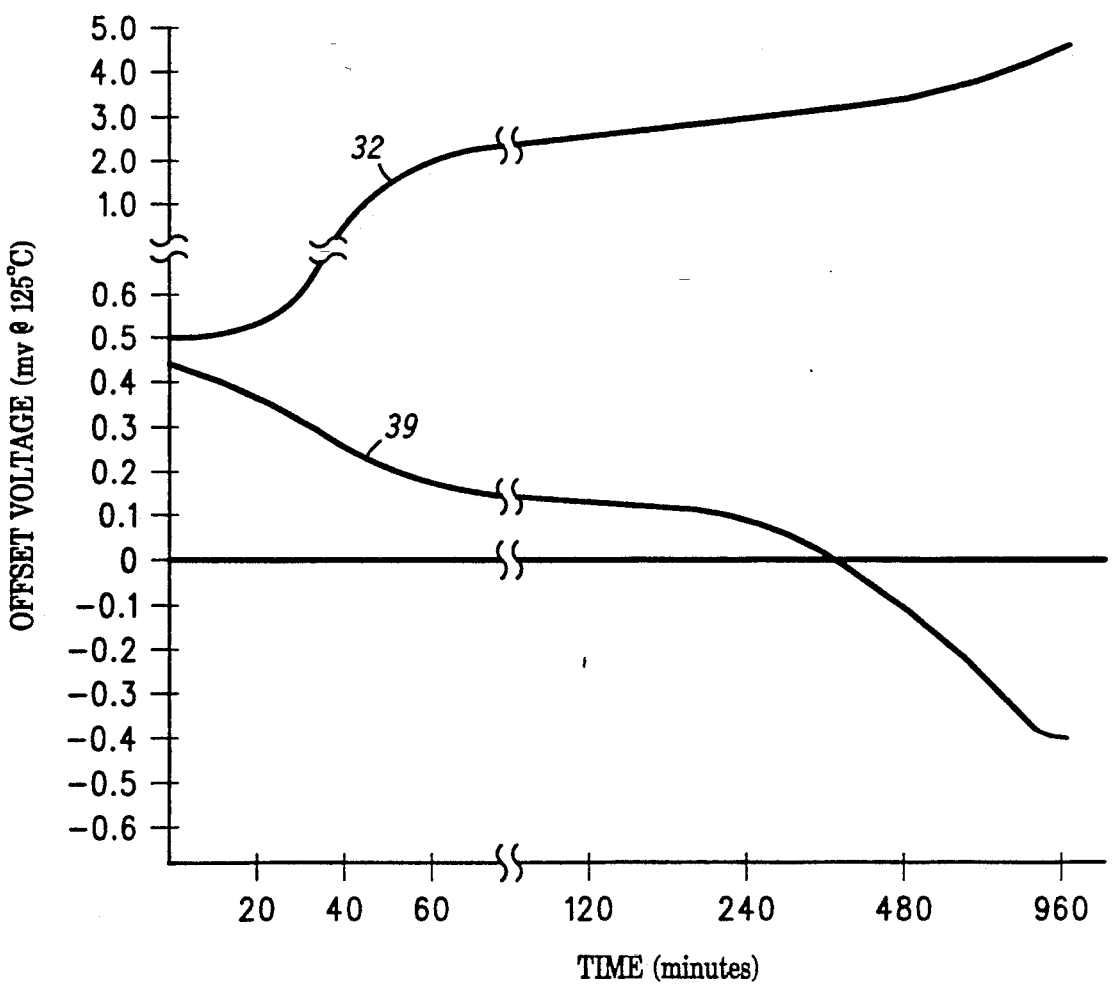

PIEZORESISTIVE TRANSDUCER WITH LOW DRIFT OUTPUT VOLTAGE

BACKGROUND OF THE INVENTION

The present invention relates, in general, to semiconductor pressure transducers, and more particularly, to a piezoresistive transducer with an output voltage that exhibits low drift.

Piezoresistive transducers had long been produced by the semiconductor industry. These transducers generally were resistors that were formed on a silicon die that had a thin flexible silicon diaphragm. The silicon diaphragm would flex in response to a differential pressure between the die's two principle surfaces. As the silicon diaphragm flexed, the resistor also flexed thereby changing the resistor's value. Piezoresistive transducers typically had four terminals and functioned as a Wheatstone bridge. A reference voltage was applied to two terminals of the piezoresistive transducer, and a sense voltage was measured between two other terminals. As a differential pressure flexed the resistor and changed its resistance, the sense voltage changed in proportion to the pressure differential. An important parameter of piezoresistive transducers was offset voltage. Offset voltage was the value of the sense voltage at a differential pressure of zero. Previous piezoresistive transducers' offset voltage changed over a period of time, or drifted. That is, the measured value of the offset voltage drifted or changed without a change in differential pressure. In addition, the drift increased with increased humidity and temperature. Although drift was generally measured at a differential pressure of zero, the drift not only affected the offset voltage, but also the output voltage at other differential pressures. The output voltage variations were not consistent and the amount of variation could be different for different measurements at different temperatures and humidity. This drift characteristic limited the accuracy of the transducers and limited the useful applications of piezoresistive transducers.

Accordingly, it would be desirable to have a piezoresistive transducer that has low drift.

SUMMARY OF THE INVENTION

Briefly stated, the present invention is achieved by creating a leakage barrier around a piezoresistive element of a piezoresistive transducer. The leakage barrier prevents the formation of a parasitic leakage path in the substrate thereby reducing the leakage current flowing through sections of the piezoresistive element, and stabilizing the resistance value and the output voltage of the piezoresistive transducer.

BRIEF DESCRIPTION OF THE DRAWINGS

FIG. 3 is a graph showing drift of a piezoresistive transducer's offset voltage;

FIG. 5 compares a graph of the offset voltage drift of a piezoresistive transducer having a leakage barrier to the graph of FIG. 3.

DETAILED DESCRIPTION OF THE DRAWINGS

The present invention provides a piezoresistive transducer that exhibits low drift. Output voltage drift is reduced by using a leakage barrier to reduce a parasitic leakage current. The leakage current flows between sections of the piezoresistive element and effects the element's resistance values. The leakage barrier stabilizes the resistance value which stabilizes the output voltage and reduces drift.

While the invention is described with specific preferred embodiments, it is evident that many alternatives and variations will be apparent to those skilled in the semiconductor arts. More specifically the invention has been described for a particular piezoresistive transducer structure and a particular protective coating, although the method is directly applicable to other transducer structures, other semiconductor materials, as well as to other protective coatings.

Figure 1:
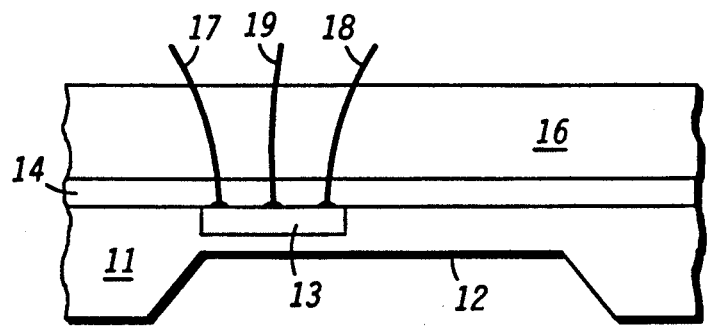
FIG. 1 is an enlarged cross-sectional view of a prior art piezoresistive transducer die.

Referring to FIG. 1, a piezoresistive transducer 10 includes a silicon substrate 11, a piezoresistive element 13, a dielectric 14, a protective coating 16, and bonding wires 17, 18, 19, and 20 (bonding wire 20 is attached to a portion of substrate 11 that is not shown in the cross-section). Substrate 11 has a thin silicon diaphragm 12 formed on a first principle surface of substrate 11. A piezoresistive element 13 is formed on a second principle surface of substrate 11 in an area that is approximately near an edge of diaphragm 12. A pressure differential between diaphragm 12 and the second principle surface of substrate 11 flexes diaphragm 12 which then flexes piezoresistive element 13. As element 13 flexes, its resistance varies proportionally to the pressure differential. A dielectric layer 14 covers substrate 11. Dielectrics are brittle, and since substrate 11 flexes, dielectric layer 14 must be thin so that it may also flex without being damaged. In most cases, using transducer 10 to measure the pressure of an environment requires transducer 10 to be exposed to that environment. Consequently, transducer 10 is most often housed in a non-hermetic package and is exposed to the environment. Dielectric layer 14 is thin and provides minimal environmental protection, therefore, a silicone gel 16 is added as a protective coating to increase the amount of environmental protection. For some specific applications, gel 16 may have various fillers for different environments. For example, a titanium dioxide filled silicone gel is opaque and white in color and may be used if the environment has intensely bright light, or a fluorosilicone gel may be used for environments containing oil, grease, or other solvents.

Figure 2:
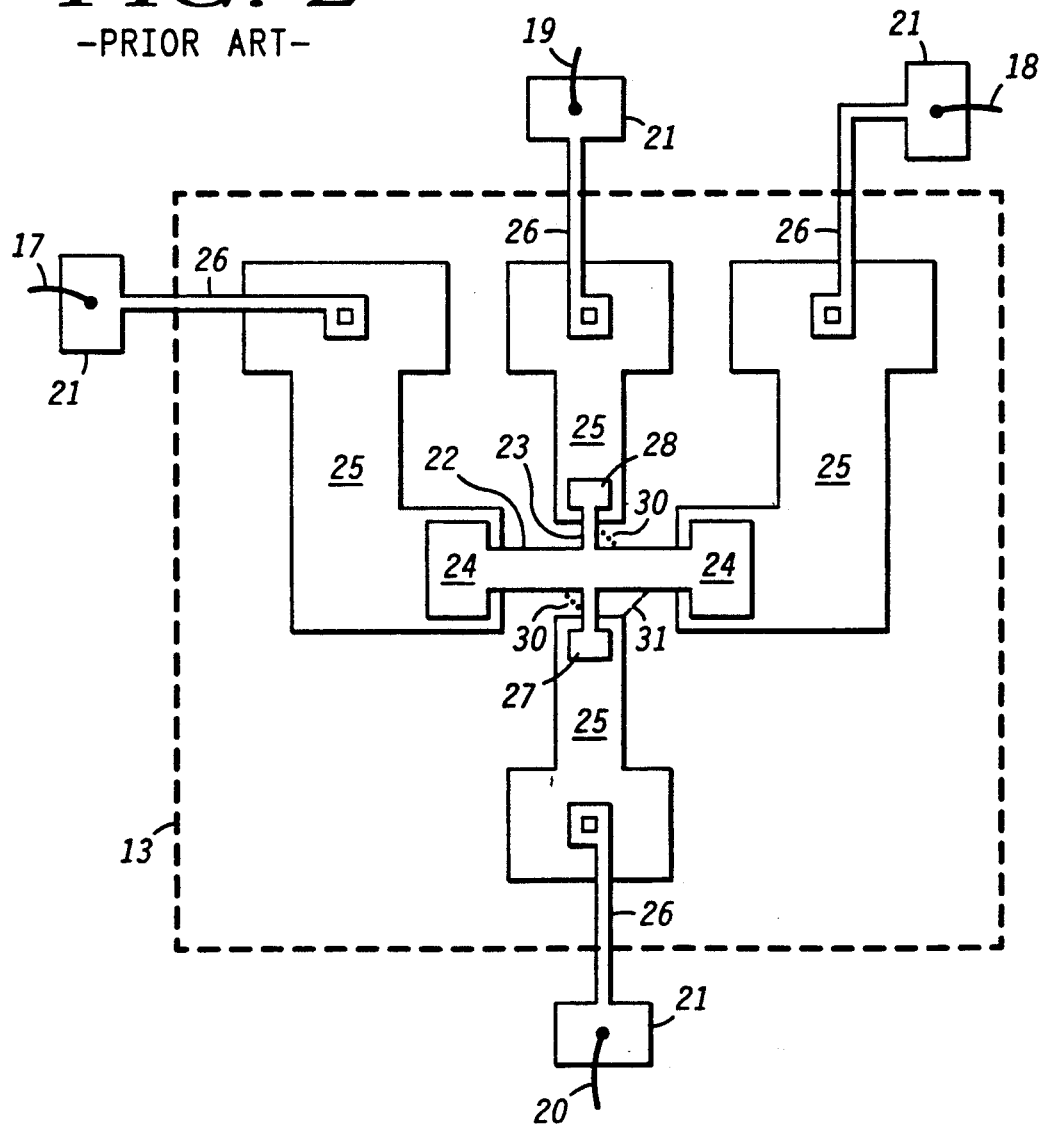
FIG. 2 is an enlarged plan view of a prior art piezoresistive element.

Referring to FIG. 2, a typical piezoresistive element 13 includes two unequal sections 22 and 23 of resistive material which intersect at right angles. Each end of section 22 has a contact area 24. Section 23 has contact area 27 at one end and contact area 28 at the other end. Segments of heavily doped contact material 25 form ohmic connections to contacts 24, 27, and 28 and couple contacts 24, 27, and 28 to conductors 26 which are coupled to bonding pads 21. Contacts 24, 27, and 28 and contact material 25 form a means for connecting to piezoresistive element 13. Bonding pads 21 and bonding wires 17, 18, 19, and 20 are usually not a portion of piezoresistive element 13 but are on substrate 11. Typically, sections 22 and 23, and contact material 25 are of the same conductivity type which is opposite of the conductivity of substrate 11. In the preferred embodiment, substrate 11 is lightly doped N type silicon, resistive sections 22 and 23 are lightly doped P type silicon, contact material 25 is heavily doped P type silicon, and conductors 26 are metallic conductors.

In operation, bonding wires 17 and 18 are connected to a reference voltage which is applied to resistive material section 22. A sense voltage is developed between contact areas 27 and 28 which can be measured through connections to bond wires 19 and 20. As a differential pressure is applied between diaphragm 12 and the second surface of substrate 11 (FIG. 1), resistive elements 22 and 23 flex changing the resistance values and the sense voltage in an approximately linear relation to the differential pressure.

It has been found that a major contributor to offset voltage drift is caused by a voltage gradient on the protective silicone gel. The reference voltage connected to bonding wires 17 and 18 develops a voltage gradient in silicone gel 16 (shown in FIG. 1). The gradient's potential is highest close to the bonding wire that is connected to the positive reference voltage and gradually decreases in the proximity of the bonding wire that is connected to the negative reference voltage. The voltage gradient is not only in a straight line between bonding wires 18 and 17, but also fringes to cover a large area. Bonding pads 21 are positioned away from resistive sections 22 and 23, yet a portion of the voltage gradient exists in gel 16 (FIG. 1) above resistive sections 22 and 23. It has also been found that the voltage gradient polarizes gel 16 creating an electric field from gel 16 to substrate 11. The most important region of the voltage gradient is in gel 16 above sections 22 and 23. The material used to produce sections 22 and 23 is a conductivity that is opposite to the material used for substrate 11. Consequently, areas such as those shown by dotted lines 30 and dashed line 31 have the same structure as a silicon gate MOS transistor that does not have a gate connection. For such areas, sections 22 and 23 function as source and drain areas of a parasitic field effect transistor, and the voltage gradient in gel 16 (FIG. 1) above the area supplies a gate voltage. Areas that are most susceptible to the formation of a parasitic field effect transistor, are points where the width to length ratio (W/L) of the parasitic transistor is largest. That is, where the length is small or the width is large, or both. The areas shown by dotted lines 30 and dashed lines 31 are three examples of such areas. When the voltage in gel 16 above such an area exceeds the threshold voltage for the area, a parasitic conduction channel is formed in substrate 11 and current flows from section 22 through substrate 11 to section 23. The additional current flow through the resistive elements varies the sense voltage that is measured at distal ends of bonding wires 19 and 20 even if the differential pressure remains constant. Continued application of the electric field over a period of time increases the voltage gradient from an initial value of approximately zero to a value that approximately equals the reference voltage. That is, polarization of gel 16 is reached over a period of time. As the voltage gradient increases over time, the gate voltage of the parasitic transistor also increases thereby creating a corresponding increase in leakage current over time, and consequently, output voltage drift. Additionally, the polarization of gel 16 exists for a period of time after the reference voltage is removed. Upon a subsequent application of the reference voltage, a residual charge may remain stored in gel 16. Consequently, the rate of drift may vary. It has been found that the effect of the polarization of the offset voltage varies with the material used for gel 16. For example, fluorosilicone gels typically have an offset voltage drift that is approximately ten times the offset voltage drift of transducers that use standard silicone gel. Some piezoresistive transducers include components to compensate for non-linear temperature characteristics of the sense voltage. Generally these components are connected in series between one or both contact areas 24 and the associated bonding pad 21. A portion of the reference voltage is dropped across these temperature compensation components, consequently these components effect the value of the voltage gradient and the voltage that represents the gate voltage of the parasitic field effect transistor.

Referring to FIG. 3, graph 32 shows offset voltage values in millivolts for a fluorosilicone coated piezoresistive transducer at an ambient temperature of 125° centigrade over a period of 960 minutes. Graph 32 indicates the offset voltage drifts approximately 4.2 mv over this time period. The drift in graph 32 represents approximately 10% of the full scale voltage of the transducer thereby reducing the transducer's accuracy and limiting the useful applications for the transducer.

Figure 4:
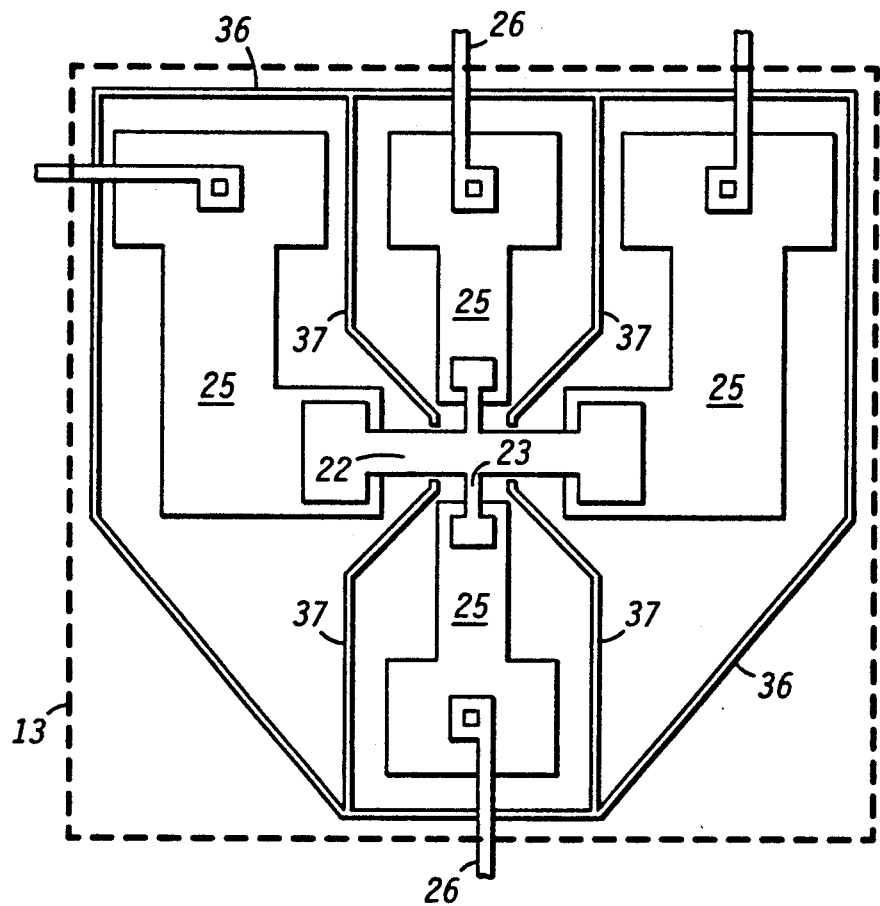
FIG. 4 is an enlarged plan view of a piezoresistive element in accordance with the present invention.

Referring to FIG. 4, the leakage current is reduced by providing a leakage barrier 37 that separates piezoresistive section 22 from section 23 and also separates contact material 25 from resistive sections 22 and 23. Leakage barrier 37 can be formed in sections and interconnected by a means for interconnect 36 as shown in FIG. 4, or could be various other shapes including a continuous section that surrounds the periphery of contact material 25 and resistive sections 22 and 23. Leakage barrier 37 is formed of a highly doped (low resistivity) material of the same conductivity type as substrate 11, and means for interconnect 36 is a material suitable for forming a low resistance conductor such as highly doped silicon, metal, etc. The highly doped material of leakage barrier 37 increases the doping concentration in the areas where a conduction channel may form. This increased doping concentration raises the parasitic transistor's threshold voltage value above the voltage value that is formed in gel 16 (FIG. 1) thereby preventing a channel from forming. Without the channel, leakage current can not easily flow through substrate 11. Since the parasitic field effect transistor generally forms a channel where the transistor's width to length ratio (W/L) is highest, it is important to have a portion of leakage barrier 37 intersecting the parasitic transistor's channel or as close to the high W/L area as possible. As shown by dotted lines 30 and dashed line 31 of FIG. 2, these areas generally are close to the right angles formed by the intersection of resistive sections 22 and 23. Consequently, it is important to have leakage barrier 37 close to the intersection. Since it is also possible for leakage current to flow between sections of contact material 25 and from contact material 25 to resistive sections 22 and 23, leakage barrier 37 should also separate these areas from each other. Although leakage barrier 37 is shown not contacting sections 22 and 23, leakage barrier 37 could make contact with sections 22 and 23. Additionally, leakage barrier section 37 can be connected to a potential that reverse biases a P-N junction which exists between substrate 11 and resistive sections 22 and 23. The reverse biased junction eliminates any other leakage current that may flow through piezoresistive sections 22 and 23. In the preferred embodiment, leakage barrier 37 is a heavily doped N-type material, substrate 11 is N-type material, and resistive sections 22 and 23 are P-type material. Also in this embodiment, leakage barrier 37 is connected to the most positive voltage applied to the piezoresistive transducer.

Leakage barrier 37 can also be applied to piezoresistive elements having other configurations, such as, four individual resistive elements that are interconnected to form a Wheatstone bridge. In such a case, leakage barrier 37 isolates each resistive element from the other resistive elements. For example, leakage barrier 37 could surround each resistive element, or could be a semi-circle that partially encloses each resistive element to provide isolation between each individual resistive element.

Leakage barrier 37 reduces current flow through substrate 11 and reduces the effect of the leakage current on the resistance value of resistive elements 22 and 23. Consequently, output voltage and offset voltage drift of transducer 10 is reduced.

Referring to FIG. 5, graph 39 shows offset voltage values in millivolts for a fluorosilicone coated piezoresistive transducer that has leakage barrier 37, and is at a temperature of 125° centigrade. Graph 32 is from FIG. 3 and is repeated in FIG. 5 for reference. Graph 39 shows an offset voltage drift of approximately one millivolt or approximately one-fourth of the drift shown by graph 32. As shown by graphs 32 and 39, leakage barrier 37 forms an effective barrier which reduces leakage current flowing between sections of piezoresistive element 13, and reduces the output voltage drift of transducer 10.

By now it should be appreciated that there has been provided a novel way to provide piezoresistive transducers that have output voltages with low drift. The leakage barrier is an effective means to reduce leakage current flowing between sections of piezoresistive transducers and to reduce drift of the transducer's output voltage. The leakage barrier is also applicable to transducers having other shapes or structures for the piezoresistive element, and to other protective coatings. The reduced output voltage drift and improved accuracy of piezoresistive transducers that have a leakage barrier enables them to be used in many more applications. The leakage barrier permits a variety of protective coatings to be used with piezoresistive transducers, including fluorosilicone gels, and therefore expands the use of piezoresistive transducers to many different environments.

We claim:

1. A piezoresistive transducer having an output voltage that has low drift comprises:
   a lightly doped silicon substrate of a first conductivity type having a flexible silicon diaphragm on a first surface of the substrate;
   a four terminal piezoresistive element of a second conductivity type, the element having two sections which are formed on a second surface of the substrate;
   a first straight section of the piezoresistive element having a contact at each distal end;
   a second straight section of the piezoresistive element having a contact at each distal end wherein the second section is shorter than the first section and has a midpoint that crosses perpendicularly to a midpoint of the first section;
   contact material of the second conductivity type that couples the contacts to metal conductors;
   an irregular periphery formed by the piezoresistive element, the contact material, and the contacts;
   a leakage buffer formed from a continuous strip of highly doped material of the first conductivity type that surrounds the irregular periphery and has material of the first conductivity type projecting from the continuous strip toward the perpendicular crossing;
   a dielectric that covers the second surface of the substrate; and
   a fluorosilicone material that covers the dielectric.

2. The piezoresistive transducer of claim 1 wherein the leakage buffer is formed as one continuous section enclosing distal boundaries of the irregular periphery, and has a plurality of projections from the continuous section toward the midpoint of the first straight section and second straight section but not touching the first straight section and second straight section.

3. The piezoresistive transducer of claim 1 wherein the leakage buffer is formed as one continuous section enclosing distal boundaries of the irregular periphery, and has a plurality of projections from the continuous section toward the midpoint of the first straight section and second straight section wherein at least one projection touches the first straight section proximal to the midpoint and at least one projection touches the second straight section proximal to the midpoint.

4. The piezoresistive transducer of claim 1 wherein the substrate is N-type material and the piezoresistive element is P-type material.

5. The piezoresistive transducer of claim 1 wherein the leakage buffer is heavily doped N-type material.

6. A method of reducing drift in piezoresistive transducers which comprises:
   providing a silicon substrate of a first conductivity type having a thin silicon diaphragm on a first surface of the substrate;
   providing a four terminal piezoresistive element of a second conductivity type on a second surface of the substrate wherein the piezoresistive element has two straight sections intersecting at right angles;
   reducing leakage current that flows in a parasitic conduction channel in the substrate by using a leakage buffer that is formed by positioning areas of highly doped material of the first conductivity type at least adjacent to each right angle of the intersection;
   covering the second surface of the substrate with a dielectric; and
   covering the dielectric with a protective coating.

7. The method of claim 6 wherein providing a four terminal piezoresistive element includes providing a contact at distal ends of an elongated section of the resistive element, a contact at distal ends of a short section of the resistive element, and crossing a midpoint of the short section perpendicularly with a midpoint of the elongated section.

8. The method of claim 6 wherein covering the dielectric with a protective coating includes covering the dielectric with a fluorosilicone gel.

9. The method of claim 6 wherein providing a silicon substrate includes providing a lightly doped N-type silicon substrate.

10. A low drift piezoresistive transducer which comprises:

a semiconductor substrate of a first conductivity type having a thin silicon diaphragm on a first surface of the substrate;

a piezoresistive element of a second conductivity type formed on a second surface of the substrate;

means for connecting the piezoresistive element to bonding pads;

a leakage buffer formed of highly doped material of the first conductivity type that surrounds a peripheral boundary formed by the piezoresistive element and the means for connecting;

a dielectric that covers at least the piezoresistive element; and a silicone gel that covers the dielectric.

11. The low drift piezoresistive transducer of claim 10 wherein the leakage buffer is formed in a first section that is a continuous strip of material, and a second section having a plurality of strips of the material projecting from the continuous strip toward a central point of the piezoresistive element.

12. The low drift piezoresistive transducer of claim 10 wherein the piezoresistive element includes a four terminal element having two sections that are perpendicular to each other.

13. The low drift piezoresistive transducer of claim 10 wherein the dielectric is silicon dioxide.

14. The low drift piezoresistive transducer of claim 10 wherein the silicone gel is a fluorosilicone gel.

15. A piezoresistive transducer having an output voltage with low drift which comprises:

a piezoresistive element having a first straight section and a second straight section intersecting at right angles; and leakage barriers that are highly doped regions of a material that is of opposite conductivity to the piezoresistive element wherein the leakage barriers are positioned inside each right angle formed by the intersection and in a proximity of each right angle.

16. The piezoresistive transducer of claim 15 wherein the leakage barriers radiate from the intersection, and are interconnected at each distal end.

17. The piezoresistive transducer of claim 15 wherein the leakage barriers are interconnected.

18. A piezoresistive transducer having an output voltage with low drift which comprises:

at least first and second resistive areas wherein the areas are interconnected to form a piezoresistive element; and a leakage barrier that is a semiconductor material which is positioned between the at least first resistive area and the at least second resistive area to prevent leakage current from flowing between the resistive areas.

* * * * *